US009792095B2

(12) United States Patent
Cheng et al.

(10) Patent No.: US 9,792,095 B2
(45) Date of Patent: Oct. 17, 2017

(54) APPARATUS AND METHOD FOR CONVERTING A PROCEDURE MANUAL TO AN AUTOMATED PROGRAM

(71) Applicant: SYMBOL TECHNOLOGIES, LLC, Lincolnshire, IL (US)

(72) Inventors: Yan-Ming M. Cheng, Inverness, IL (US); Robert E Beach, Los Altos, CA (US)

(73) Assignee: Symbol Technologies, LLC, Holtsville, NY (US)

( * ) Notice: Subject to any disclaimer, the term of this patent is extended or adjusted under 35 U.S.C. 154(b) by 41 days.

(21) Appl. No.: 14/553,426

(22) Filed: Nov. 25, 2014

(65) Prior Publication Data
US 2016/0147507 A1  May 26, 2016

(51) Int. Cl.
*G06F 9/44* (2006.01)

(52) U.S. Cl.
CPC . *G06F 8/35* (2013.01); *G06F 8/10* (2013.01)

(58) Field of Classification Search
CPC .............................................. G06F 8/30–8/40
USPC ................................................... 717/104–106
See application file for complete search history.

(56) References Cited

U.S. PATENT DOCUMENTS

| | | | |
|---|---|---|---|
| 5,768,590 A * | 6/1998 | Kimura | G06F 8/30 717/106 |
| 6,601,026 B2 * | 7/2003 | Appelt | G06F 17/30616 704/9 |
| 6,920,420 B2 | 7/2005 | Lin | |
| 7,010,476 B2 | 3/2006 | Karttunen et al. | |
| 7,085,708 B2 | 8/2006 | Manson | |
| 7,337,170 B2 * | 2/2008 | Lee | G06F 17/3043 |
| 7,610,192 B1 | 10/2009 | Jamieson | |
| 7,765,097 B1 | 7/2010 | Yu et al. | |
| 7,778,944 B2 | 8/2010 | Bangalore | |
| 7,886,267 B2 * | 2/2011 | Pratt | G06F 9/4448 717/104 |
| 7,933,774 B1 | 4/2011 | Begeja et al. | |
| 7,962,893 B2 * | 6/2011 | Tatsumi | G01N 30/24 717/106 |
| 8,131,132 B2 | 3/2012 | Klappert | |
| 8,219,968 B2 * | 7/2012 | O'Brien | G06F 8/24 717/104 |

(Continued)

FOREIGN PATENT DOCUMENTS

EP    2003572 B1    8/2010

OTHER PUBLICATIONS

NLP-Based Coding of Clinical Documents: Automated Encoding of Clinical Documents Based on Natural Language Processing—Carol Friedman, Phd, Lyudmila Shagina, MS, Yves Lussier, MD, George Hripcsak, MD, MS; Journal of the American Medical Informatics Association vol. 11 No. 5 Sep. / Oct. 2004.*

(Continued)

*Primary Examiner* — Francisco Aponte

(57) ABSTRACT

A computing device receives a query about at least one concept and at least one document associated with the at least one concept. The computing device accesses a plurality of models created based on information in a labeled database. The computing device decodes information in the at least one document using the plurality of models. Responsive to the decoding, the computing device generate a program with steps associated with the at least one concept.

14 Claims, 3 Drawing Sheets

(56) References Cited

U.S. PATENT DOCUMENTS

| | | | |
|---|---|---|---|
| 8,447,588 B2 | 5/2013 | Karttunen | |
| 8,448,132 B2* | 5/2013 | Lochmann | G06F 8/24 |
| | | | 707/999.102 |
| 8,700,997 B1* | 4/2014 | Yang | G06F 17/273 |
| | | | 715/234 |
| 8,725,493 B2 | 5/2014 | Womack et al. | |
| 8,782,088 B2 | 7/2014 | Carus et al. | |
| 8,856,726 B2* | 10/2014 | Conrad | G06F 11/3604 |
| | | | 717/104 |
| 8,997,035 B2* | 3/2015 | Kevorkian | G06F 8/10 |
| | | | 717/104 |
| 9,069,814 B2* | 6/2015 | Wolfram | G06F 17/30401 |
| 2002/0007358 A1* | 1/2002 | Johnson | G06F 17/2755 |
| 2003/0106040 A1* | 6/2003 | Rubin | G06F 8/30 |
| | | | 717/106 |
| 2005/0138602 A1* | 6/2005 | Hinchey | G06F 8/30 |
| | | | 717/106 |
| 2007/0209013 A1* | 9/2007 | Ramsey | G06F 17/30893 |
| | | | 715/769 |
| 2008/0229278 A1* | 9/2008 | Liu | G06F 8/36 |
| | | | 717/106 |
| 2009/0083027 A1* | 3/2009 | Hollingsworth | G06F 17/277 |
| | | | 704/9 |
| 2009/0171923 A1* | 7/2009 | Nash | G06F 17/30654 |
| 2010/0070448 A1* | 3/2010 | Omoigui | H01L 27/1463 |
| | | | 706/47 |
| 2011/0010686 A1* | 1/2011 | Wilson | G06F 8/24 |
| | | | 717/104 |
| 2012/0060216 A1* | 3/2012 | Chaudhri | G06F 19/322 |
| | | | 726/21 |
| 2012/0185234 A1* | 7/2012 | Visel | G06N 3/10 |
| | | | 703/27 |
| 2012/0191716 A1* | 7/2012 | Omoigui | H01L 27/1463 |
| | | | 707/740 |
| 2013/0055197 A1* | 2/2013 | Balan | G06F 8/30 |
| | | | 717/105 |
| 2013/0124523 A1* | 5/2013 | Rogers | G06F 19/32 |
| | | | 707/737 |
| 2014/0013299 A1* | 1/2014 | Bordeaux | G06F 8/30 |
| | | | 717/106 |
| 2014/0019116 A1 | 1/2014 | Lundberg et al. | |
| 2014/0380270 A1* | 12/2014 | Lovisa | H04L 67/2838 |
| | | | 717/107 |
| 2015/0135159 A1* | 5/2015 | Ezion | G06F 8/30 |
| | | | 717/106 |
| 2015/0261744 A1* | 9/2015 | Suenbuel | G06F 17/271 |
| | | | 704/9 |
| 2015/0363171 A1* | 12/2015 | Esfahany | G06F 9/45504 |
| | | | 717/106 |

OTHER PUBLICATIONS

Behavior Research Methods 2006, 38(2), 262-279: Evaluation of unsupervised semantic mapping of natural language with Leximancer concept mapping—Andrew E. Smith and Michael S. Humphreys University of Queensland, Brisbane, Queensland, Australia—Copyright 2006 Psychonomic Society, Inc.*

The AT&T Spoken Language Understanding System—Narendra Gupta, Gokhan Tur, Dilek Hakkani-Tür, Member, IEEE, Srinivas Bangalore, Giuseppe Riccardi, Senior Member, IEEE, and Mazin Gilbert, Senior Member, IEEE—IEEE Transactions on Audio, Speech, and Language Processing, vol. 14, No. 1, Jan. 2006.*

"From Natural Language Specifications to Program Input Parsers" by Tao Lei, Fan Long, Regina Barzilay, Martin Rinard, Computer Science and Artificial Intelligence Laboratory, MIT, Aug. 28, 2014.

"NLP (Natural Language Processing) for NLP (Natural Language Programming)" by Rada Mihalcea, Hugo Liu, Henry Lieberman, Computer Science Dept. University of North Texas, Aug. 28, 2014.

"Learning to Parse Natural Language Commands to a Robot Control System" by Cynthia Matuszek, Evan Herbst, Luke Zettlemoyer, Dieter Fox, Aug. 28, 2014.

"Natural Language Processing in the Control of Unmanned Aerial Vehicles" by E. Craparo and E. Feron, Massachusetts Institute of Technology, Aug. 16-19, 2004.

"Inferring Maps and Behaviors From Natural Language Instructions" by Felix Duvallet, Matthew R. Walter, Thomas Howard, Sachithra Hemachandra, Jean Oh, Seth Teller, Nicholoas Roy, and Anthony Stentz, Robotics Institute, Carnegie Mellon University and CS &AI Lab, Massachusetts Institute of Technology, Aug. 28, 2014.

Learning to Interpret Natural Language Navigation Instructions From Observations by David L. Chen and Raymond J. Mooney, Dept. of Computer Science, University of Texas AT Austin. Aug. 14, 2014.

* cited by examiner

APPARATUS AND METHOD FOR CONVERTING A PROCEDURE MANUAL TO AN AUTOMATED PROGRAM

BACKGROUND OF THE INVENTION

Some professionals such as police officers and others in public safety occupations are required to follow predefined procedures/steps when implementing certain tasks. These predefined procedures are typically defined by an organization employing the professional to mitigate legal and other risks to the organization. For example, a police officer is required to follow predefined procedures, as defined by a police department employing the police officer, when effectuating an arrest or using a weapon. If the police officer fails to follow the predefined procedures when, for example, effectuating an arrest, the failure by the police officer to follow the predefined procedures may compromise an investigation, expose the police department to a legal claim, and/or result in release of an apprehended individual.

Even with adequate training, it is impossible for an individual to memorize and retain all procedures associated with all tasks related to the individual's job. It is particularly difficult for the individual to memorize and retain procedures associated with tasks that the individual does not perform frequently. To provide a reference source, the procedures may be written in a manual or a training document. However, when an individual is performing a task, the reference source may or may not be accessible.

In some environments, a robot may be employed to replace a human in automating a task or a complex robotic and human collaboration may be employed to automate certain tasks. For instance, robots or other electronic devices may be configured to carry out tasks simultaneously and/or cooperatively with humans. In some instances to aid an individual in remembering procedures, a robot may be employed to jointly perform a task with an individual, wherein in carrying out the task, steps in a procedure associated with the task are provided by the robot and performed by the individual. In these instances, it is necessary to coordinate the robotic instructions with the tasks that are to be carried out by the individual. As such, a trained computer science professional has to understand the procedures that are documented in, for example, a procedure manual in order to program the procedures into a computer language. In addition to the initial programming cost, as the procedures are updated, the computer program must be updated. The programming cost associated with converting documented procedures into a programming language increases the cost of the human and robot collaboration.

Accordingly, there is a need for an improved method and apparatus for converting documented procedures to an automated program.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
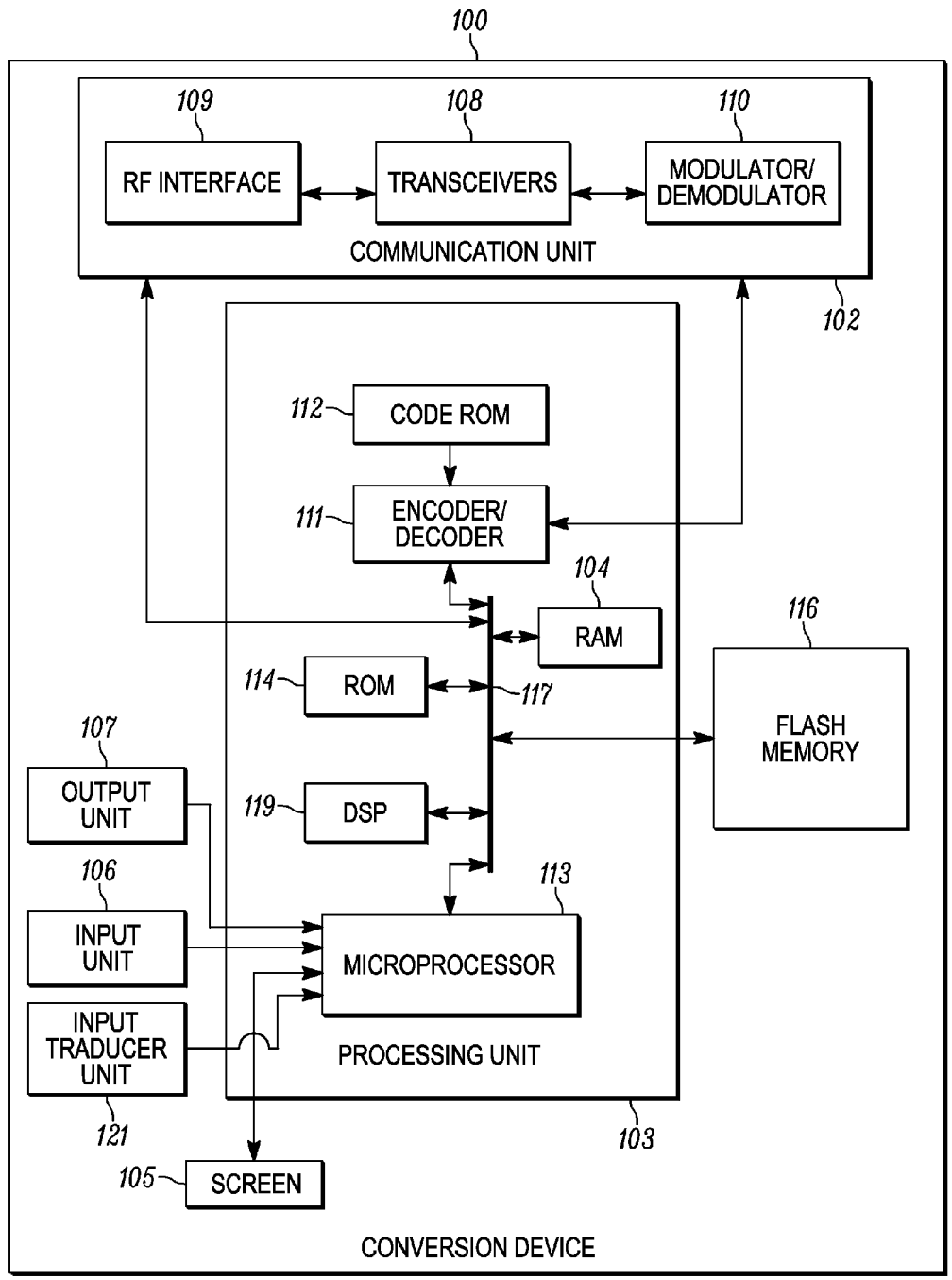
FIG. 1 is a block diagram of a conversion device used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatuses for converting documented procedures to an automated program. A computing device receives a query about at least one concept and at least one document associated with the at least one concept. The computing device accesses a plurality of models created based on information in a labeled database. The computing device decodes information in the at least one document using the plurality of models. Responsive to the decoding, the computing device generate a program with steps associated with the at least one concept.

FIG. 1 is a block diagram of a conversion device used in accordance with some embodiments. Conversion device 100 is configured to convert procedures provided in a manual or another document (referred to herein as a natural language document, a procedure manual or simply as a document) to an electronic form that can be verified by conversion device 100. Conversion device 100 may be a computing device, for example, a robot, a mobile or stationary computer or smart phone. If necessary, conversion device 100 may be configured to assist an individual in executing some or all of the steps associated with a set of procedures, thereby reducing the time required to train individuals on the set of procedures provided in a document and/or improving the accuracy of how tasks associated with the set of procedures are executed.

Conversion device 100, for example, may include a communications unit 102 coupled to a common data and address bus 117 of a processor 103. Conversion device 100 may also include an input unit (e.g., keypad, pointing device, etc.) 106, an output transducer unit (e.g., speaker) 107, an input transducer unit (e.g., a microphone) (MIC) 121, and a display screen 105, each coupled to be in communication with the processor 103.

The processor 103 may include, that is, implement, an encoder/decoder 111 with an associated code read-only memory (ROM) 112 for storing data for encoding and decoding voice, data, control, or other signals that may be transmitted or received by conversion device 100. The processor 103 may further include one or more of a microprocessor 113 and digital signal processor (DSP) 119 coupled, by the common data and address bus 117, to the encoder/decoder 111 and to one or more memory devices, such as a read only memory (ROM) 114, a random access memory (RAM) 104, and a static memory 116. One or more of ROM 114, RAM 104 and flash memory 116 may be included as part of processor 103 or may be separate from, and coupled to, the processor 103. The encoder/decoder 111 may be implemented by microprocessor 113 or DSP 119, or may be implemented by a separate component of the processor 103 and coupled to other components of the processor 103 via bus 117.

Communications unit 102 may include an RF interface 109 configurable to communicate with network components, and other user equipment within its communication range. Communications unit 102 may include one or more broadband and/or narrowband transceivers 108, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 102 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 110 that is coupled to the encoder/decoder 111.

Figure 3:
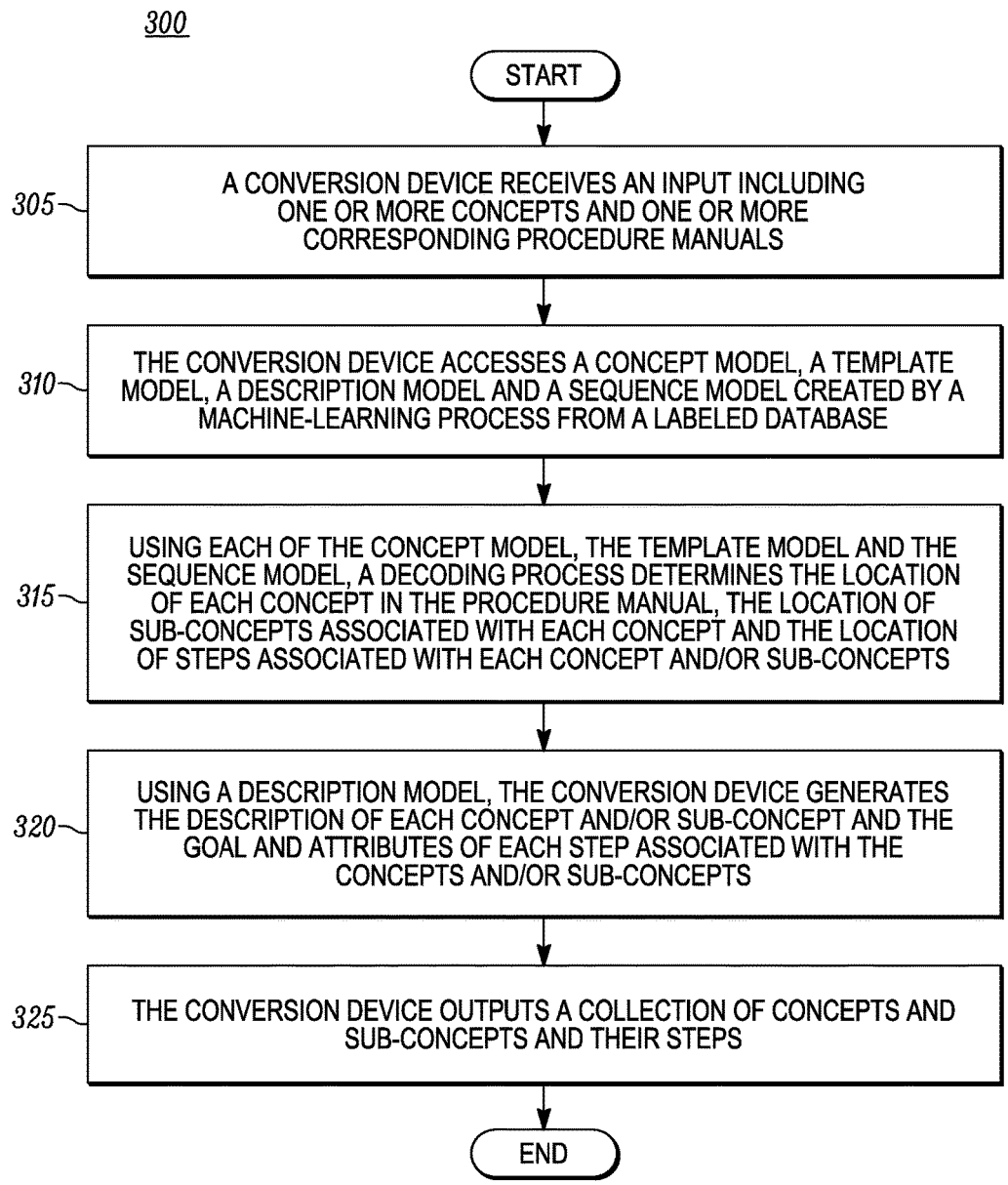
FIG. 3 is a flow diagram of a method implemented in accordance with some embodiments.

The one or more memory devices 112, 114, 116 are configured to store non-transitory computer-executable instructions and code for decoding or encoding data such as control, request, or instruction messages, channel change messages, and/or data or voice messages that may be transmitted or received by conversion device 100 and other programs and instructions that, when executed by the processor 103, provide for the device 100 to perform a set of functions and operations in response to executing the instructions described herein as being performed by such a device, such as the implementation of the encoder/decoder 111 and one or more of the steps set forth in FIG. 3.

In converting procedures documented in a natural language document to an electronic form, subsequent to accessing at least one natural language document, conversion device 100 is configured to create one or more models based on information in the document, wherein the information in the documents is associated with one or more concepts/entities. A concept refers to a topic or activity and the steps associated with carrying out the topic or activity. As such, the document also includes the procedures/steps that are associated with each concept. Conversion device 100 is configured to decode the created models and generate a program with steps associated with a concept. Non-limiting examples of a concept that may be included in a document may include a "use of force" concept and the procedures for effectuating the "use of force concept", a concept of how to "carry a weapon across a border" and the procedures for effectuating the concept of how to "carry a weapon across a border", and a concept of "how to use an emergency vehicle" and the procedures for effectuating the concept of "how to use an emergency vehicle".

Each natural language document has a structure. The structures of two or more documents may or may not be uniformed. For example, in an organization, manuals written for two agencies in the organization may be organized differently and/or be written in different styles. As such, the structure of a document written for a first agency in the organization may differ from the structure of a document written for the second organization. As noted previously, each document may include one or more concepts and the steps associated with each concept, wherein each concept and its associated steps may be included in a labeled section. For instance, a document may include a definition concept wherein the associated steps of the definition concept may be included in a labeled definition section, a purpose concept for describing the purpose of the document wherein the associated steps of the purpose concept may be included in a labeled purpose section, a scope concept for describing the scope of the document wherein the associated steps for the scope concept may be included in a labeled scope section, and a philosophy concept for describing the philosophy of the document wherein the associated steps for the philosophy concept may be included in a labeled philosophy section.

When conversion device 100 receives a query about at least one concept and/or sub-concept, in response to the query, the conversion device 100 accesses the collection of concepts and sub-concepts. Conversion device 100 compares the query with the names and descriptions in the accessed concepts and sub-concepts to find an accessed concept and/or sub-concept that is the best semantic match for a queried concept and/or sub-concept). Conversion device 100 outputs the steps of the accessed concept and/or sub-concept that is the best semantic match for the queried concept and/or sub-concept.

Figure 2:
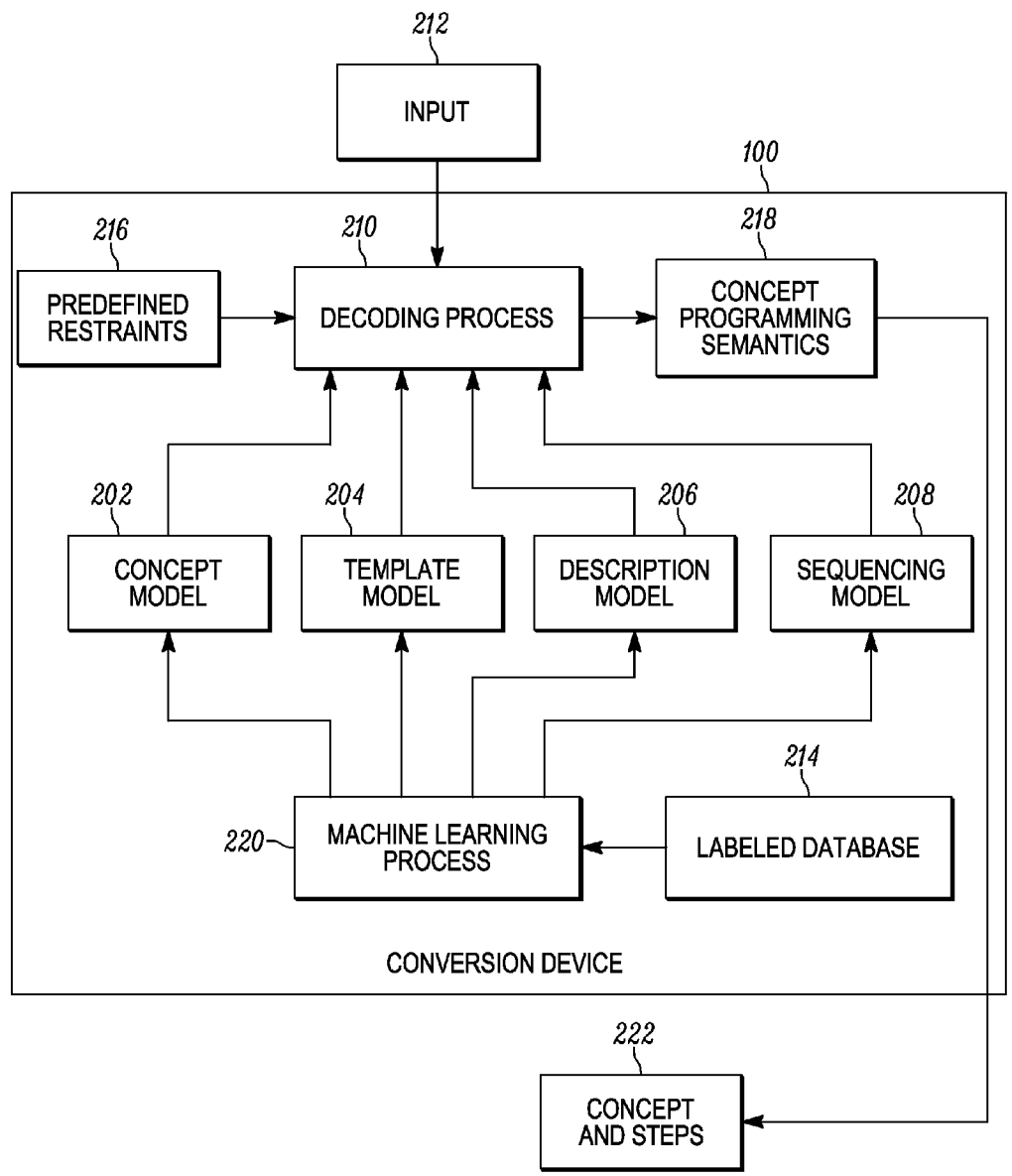
FIG. 2 is a block diagram of how the conversion device converts a natural language document into a program with steps in accordance with some embodiments.

FIG. 2 is a block diagram of how the conversion device converts a natural language document into a program with steps in accordance with some embodiments. Concepts in one or more natural language documents may be identified or labeled by, for example, titles or sub-titles, and each concept may be located in a specific location in the natural language documents. The procedures or steps for each concept may be structured with, for example, bullets, numbering, or based on a paragraph form. Each step may include a description and the steps in each concept may or may not include a sequence. For example, a document may include procedures for a concept on "how to effectuate an arrest". The sequence of the steps for this concept may include first, arresting an individual, second, reading legal rights to the individual, and third, asking the individual questions. In another example, a concept in the natural language document may include procedures on "how to carry a weapon across a boundary". The steps for this concept may include obtaining a weapon permit and obtaining authorization to carry the weapon across the boundary, although either step in this concept may be performed first.

In order to convert a natural language document into a program with steps, conversion device 100 may receive an input 212 including a query for at least one concept and including at least one natural language document, for example, a training procedure manual. In addition to accessing the natural language document, conversion device 100 may also access a labeled database 214 that may include a collection of sample and/or historical procedure manuals, concepts, sub-concepts, steps, concept descriptions, step descriptions and/or step dependencies. The information in labeled database 214 may include information that was previously generated by one or more conversion devices and the information in labeled database 214 may be labeled by, for example, experts or conversion devices. A machine-learning process 220, for example, a neural network algorithm, uses the information in labeled database 214 to generate a concept model 202, a template model 204, a description model 206, and an optional sequencing model 208, if the steps of a concept have to be executed sequentially.

Conversion device 100 executes a decoding process 210 to decode each of the concepts included in input 212, using concept model 202, template model 204, description model 206, and sequencing model 208. In the decoding, conversion device 100 may obtain and apply predefined restraints 216. An example of a predefined restraint may be that a concept may only be included in one chapter of one document in the procedure manuals. Another example of a predefined restraint may be a numbering convention of a heading of a concept or sub-concept.

Decoding process 210 generates concept programming semantics 218 that may include steps and transitions associated with the queried concept. At each step in concept programming semantics 218, conversion device 100 determines if there is a goal, status, verifiable attribute and, if necessary, executable code. As an example, in the procedures for a concept for applying "pain compliance technique" in a police agency, there are three steps: (a) the degree to which the application of a pain compliance technique may be controlled given a level of resistance; (b) whether an individual on whom the technique is being applied can comply with the direction or orders of an officer; and (c) whether the individual has been given sufficient opportunity to comply with direction or orders of the officer. In step (a), the goal may be for conversion device 100 to determine how much pain (strong, median and light) to apply; in step (b), the goal may be for conversion device 100 to determine the attributes of the person complying with the order (for example, is the person raising both hands); and in step (c), the goal may be for conversion device 100 to determine the attributes of an opportunity considering, for example, repetitions of an order and whether the duration after a given order is sufficient.

Consider an example where conversion device 100 is provided an input 212 that includes a "use of force" concept and procedure manuals that include "use of force" concept. Subsequent to accessing the procedure manuals provided in input 212 and determining that input 212 includes a query for the "use of force" concept, conversion device 100 may use concept model 202 for determining a specific location and span in the procedure manuals that includes the "use of force" concept. For instance, the concept model 202 may include "use of force" concept information that is extracted by machine learning process 220 from labeled database 214. Concept model 202 may thus be used to determine, for example, that the "use of force" concept is completely described from line M of page N to line X of page Y in the procedure manuals. Conversion device 100 may also apply predefined restraints 216 in determining that a specific area in the procedure manuals is related to the "use of force" concept.

Deviating from the example, where the input includes a query for the "use of force" concept, consider an example where a document includes a definition concept, a purpose concept, a scope concept, and a philosophy concept. In this example, concept model 202 may be used to determine that definitions associated with the definition concept are completely described in a section of the document with the heading "Definition"; that the purpose of the document is completely described in a section of the document with the heading "Purpose"; that the scope of the document is completely described in a section of the document with the heading "Scope"; and that the philosophy of the document is completely described in a section of the document with heading "Philosophy". Concept model 202 may therefore be used to determine where concepts are located in a natural language document using, for example, section or subsection titles.

Returning to the example, where the input includes a query for the "use of force" concept, conversion device 100 may also use template model 204 to determine whether there are sub-concepts associated with the "use of force" concept in the procedure manuals and to determine the locations of sub-concepts. Conversion device 100 may also use template model 204 to determine the steps of a concept and/or sub-concept in the procedure manuals and the locations of the steps. As an example, in the procedures for the "use of force" concept in a police agency, there may be four sub-concepts: (1) a sub-concept associated with the use of force to effect an arrest, (2) a sub-concept associated with factors used to determine the reasonableness of force, (3) a sub-concept associated with application of pain compliance techniques, and (4) a sub-concept associated with a carotid control hold. Each sub-concept may include specific steps. Template model 204 may be used to determine a likelihood of the "use of force" concept including a number of sub-concepts, for example, four sub-concepts. Template model 204 may also be used to determine a likelihood of certain steps being included in a sub-concept.

Conversion device 100 may also use description model 206 to generate the summary or description of a concept and/or sub-concept in a given section of the procedure manual. Conversion device 100 may also use description model 206 to generate the goal and attributes of a step in a given location of the procedure manual. Description model 206 may also generate dependency of a step in a given location of the procedure manual. For instance, the procedures for a sub-concept for applying "pain compliance technique" in a police agency, may include a description such as, "Pain compliance techniques may be effective in controlling a physically or actively resisting individual . . . ", and three steps: (a) the degree to which the application of a pain compliance technique may be controlled given a level of resistance; (b) whether an individual on whom the technique is being applied can comply with the direction or orders of an officer; and (c) whether the individual has been given sufficient opportunity to comply with direction or orders of the officer. In step (a), the goal may be for conversion device 100 to determine how much pain (strong, median and light) to apply. Using the information provided in step (a), description model 206 may generate an appropriate attribute for step (a). In other words, description model 206 may determine that strong, median or light force is to be applied in a given situation.

Conversion device 100 may also generate sequencing model 208 to determine a sequence of steps that are to be executed, if the description model 206 has determined that there exists dependency among steps. A non-limiting example of a sequencing model includes a Markov Model. Sequencing model 208 that may be used to determine a sequential relationship of parts of a concept or determine a writing style used in document to define a concept or sub-concept. For instance, given a hypothetical sequence of a purpose description followed by a scope description, a definition description and a step list, sequencing model 208 may generate a likelihood of determining an overall style of the document including the hypothetical sequence.

Provided with a sequence of concept names and a corresponding sequence of procedure manuals as input 212, conversion device 100 may apply each of concept model 202, template model 204, description model 206, and sequencing model 208 and one or more common/predefined restraints to decoding process 210, for example, a Viterbi algorithm. Decoding process 210 is configured to find the best match between a sequence of concept names and the procedure manuals using concept model 202, template model 204 and one or more common/predefined restraints. Within the procedure manual segments corresponding to a concept, the decoding process 210 is configured to find the best match of a concept description and steps using template model 204, sequence model 208 and one or more common/predefined restraints. Within each concept description, description model 206 generates the goal of the concept; and within each step, description model 206 generates step attributes and determines whether a first step depends on another steps for execution.

As an example, provided with a list of three named concepts: a "use of force" concept, a "vehicle pursuit" concept, and an "officer response to calls" concept and provided with one or more procedure manuals of general police operation, conversion device 100 outputs concept programming semantics 218 for the three concepts, descriptions associated with each of the three concepts, sub-concepts of each concept, and steps of each sub-concept. Conversion device 100 may then translate the semantics, if necessary, into executable codes. Accordingly, from concept programming semantics 218, conversion device 100 may output the concepts, the sub-concepts associated with the concepts and the steps associated with the concepts in block 222.

FIG. 3 is a flow diagram of a method 300 implemented in accordance with some embodiments. At 305, a conversion device receives an input including one or more concepts and one or more corresponding procedure manuals. At 310, the conversion device accesses a concept model, a template model, a description model and a sequence model created by a machine-learning process from a labeled database. At 315, using each of the concept model, the template model and the sequence model, a decoding process determines the location of each concept in the procedure manual, the location of sub-concepts associated with each concept and the location of steps associated with each concept and/or sub-concepts. At 320, using the description model, conversion device 100 generates the goal description of each concept and/or sub-concept and goal and attributes of each step associated with the concepts and/or sub-concepts. At 325, conversion device 100 outputs a collection of concepts and sub-concepts and their steps.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
receiving, by a computing device, a query about at least one concept, including one or more associated steps, and at least one natural language document associated with the at least one concept;
accessing, by the computing device, a plurality of models created based on information in a labeled database;
decoding, by the computing device, information in the at least one natural language document using the plurality of models; and
responsive to the decoding, generating, by the computing device, a program having computer executable code corresponding to the one or more steps associated with the at least one concept,
wherein:
(a) the plurality of models include:
a concept model for determining a specific location in the at least one natural language document that includes the at least one concept;
a template model for determining at least one of steps associated with the at least one concept and a sub-concept associated with the at least one concept;
a description model for generating attributes and determining whether a first step depends on another step for execution; and
a sequencing model for determining a sequence of the steps associated with the at least one concept;
(b) the decoding comprises:
determining a location of the at least one concept in the at least one natural language document, a location of a sub-concept associated with the at least one concept, and a location of steps associated with at least one of the at least one concept and the sub-concept; and
decoding the at least one concept included in the query using the concept model, the template model, the description model, and the sequencing model.

2. The method of claim 1, wherein the decoding comprises applying a predefined restraint and the plurality of models to a decoding process.

3. The method of claim 1, wherein the sequencing model is used to determine a sequential relationship of parts of the concept.

4. The method of claim 1, wherein the description model is used to generate a description of one of the at least one concept and a sub-concept and an attribute of each step associated with the at least one concept and the sub-concept.

5. The method of claim 1, wherein the generating comprises generating programming semantics including steps and transitions associated with the at least one concept.

6. The method of claim 1, wherein the steps associated with the at least one concept are structured and include at least one of a description and a sequence.

7. The method of claim 1 wherein the computer-executable instructions corresponding to the one or more steps associated with the at least one concept are executed by a robot.

8. A computing device, comprises:
a memory configured to store non-transitory computer-executable instructions;
a transceiver configured to receive a query about at least one concept, including one or more associated steps, and at least one natural language document associated with the at least one concept;
a processor configured to perform a set of functions including:
accessing a plurality of models created based on information in a labeled database;
decoding information in the at least one document using the plurality of models; and
responsive to the decoding, generating a program having the computer-executable instructions corresponding to the one or more steps associated with the at least one concept,
wherein:
(a) the plurality of models include:
a concept model for determining a specific location in the at least one natural language document that includes the at least one concept;
a template model for determining at least one of steps associated with the at least one concept and a sub-concept associated with the at least one concept;
a description model for generating attributes and determining whether a first step depends on another step for execution; and
a sequencing model for determining a sequence of the steps associated with the at least one concept;
(b) the processor is further configured to perform the decoding by:
determining a location of the at least one concept in the at least one natural language document, a location of a sub-concept associated with the at least one concept, and a location of steps associated with at least one of the at least one concept and the sub-concept; and
decoding the at least one concept included in the query using the concept model, the template model, the description model, and the sequencing model.

9. The computing device of claim 8, wherein in decoding the processor is configured to apply a predefined restraint and the plurality of models to a decoding process.

10. The computing device of claim 8, wherein the sequencing model is used to determine a sequential relationship of parts of the concept.

11. The computing device of claim 8, wherein the description model is used to generate a description of one of the at least one concept and a sub-concept and an attribute of each step associated with the at least one concept and the sub-concept.

12. The computing device of claim 8, wherein generating comprises generating programming semantics including steps and transitions associated with the at least one concept.

13. The computing device of claim 8, wherein the steps associated with the at least one concept are structured and include at least one of a description and a sequence.

14. The computing device of claim 8 wherein the program having the computer-executable instructions corresponding to the one or more steps associated with the at least one concept is executed by a robot.

* * * * *